United States Patent [19]
Cann et al.

[11] Patent Number: 4,777,687
[45] Date of Patent: Oct. 18, 1988

[54] TACK-OFF ASSEMBLY

[75] Inventors: Roger S. Cann; Frank A. Bloomer, both of Mt. Clemens, Mich.

[73] Assignee: Behr Industrial Equipment, Inc., Rochester, Mich.

[21] Appl. No.: 42,285

[22] Filed: Apr. 24, 1987

[51] Int. Cl.⁴ .............................................. B60S 3/06
[52] U.S. Cl. ............................ 15/1.5 R; 15/DIG. 2; 15/3; 15/53 AB; 15/97 B; 15/181; 15/234; 15/306 B
[58] Field of Search .......... 15/53 A, 53 AB, DIG. 2, 15/97 B, 179, 181, 234, 1.5 R, 3, 306

[56] References Cited

U.S. PATENT DOCUMENTS 3,772,723 11/1973 Krimm .............................. 15/53 AB
4,689,749 8/1987 Glogowski .................. 15/53 AB X

FOREIGN PATENT DOCUMENTS 0925306 5/1982 U.S.S.R. ............................... 15/181

Primary Examiner—Edward L. Roberts
Attorney, Agent, or Firm—Reising, Ethington, Barnad, Perry & Milton

[57] ABSTRACT

A tack-off assembly (10) includes a support structure (12) defining a path (14) extending therethrough. A rotatable axle (16) is mounted from the support structure (12) defining an axis A. A feather duster assembly (18) is mounted on the axle (16) for removing dust particles by contacting the surface of an object (20) traveling along the path (14). The feathers (98) of the feather duster assembly (18) are mounted on a plurality of hubs (24) which are expandable for selectively expanding and contracting the length of the feather assembly (18) along the axis A.

13 Claims, 3 Drawing Sheets

TACK-OFF ASSEMBLY

TECHNICAL FIELD

The present invention relates to an assembly for wiping an object passing therethrough. More particularly, the present invention relates to a tack-off assembly for removing dust particles from a vehicle body prior to painting of the vehicle body.

BACKGROUND ART

In the painting industry, it is necessary to tack off a vehicle body prior to painting of the vehicle body. Tacking off generally refers to the process of passing a vehicle body through an assembly, including a plurality of feather dusters. The feather dusters generally comprise a plurality of feathers, such as ostrich feathers, mounted on a rotatable hub. As the vehicle body passes through the assembly, the rotating feathers contact the vehicle body surface. The wiping action of the feathers against the vehicle body creates an electrostatic charge on the feathers. The charged feathers attract dust from the vehicle body. A shroud assembly is mounted over the feather dusters. Within the shroud assembly is an ionic discharge unit which continually discharges the feathers, thereby releasing the dust. A vacuum assembly within the shroud assembly removes the dust from within the shroud assembly.

Problems arise when the vehicle bodies present nonplanar surfaces and depressions of varying widths. Specifically, vehicles bodies, such as flat-bed truck bodies, have planar surfaces on the hood and roof of the cab, but further include recessed portions of decreased width within the cargo-carrying area of the body. Complex and expensive machines have been devised which can tack off the hood and roof of the cab with one duster while using alternative means for tacking off the bed of the cargo-carrying area.

The present invention provides a simplified and mush less expensive means for tacking off recessed areas of different widths with a single machine.

SUMMARY OF THE INVENTION

The present invention provides a tack-off assembly including a support structure defining a path extending therethrough and axle means mounted on the support structure defining an axis A. Tack-off means are mounted on the axle means for removing dust particles by contacting the surface of an object traveling along the path. The improvement is characterized by expandable hub means connecting the tack-off means to the axle means for selectively expanding and contracting the tack-off means along the axis A.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
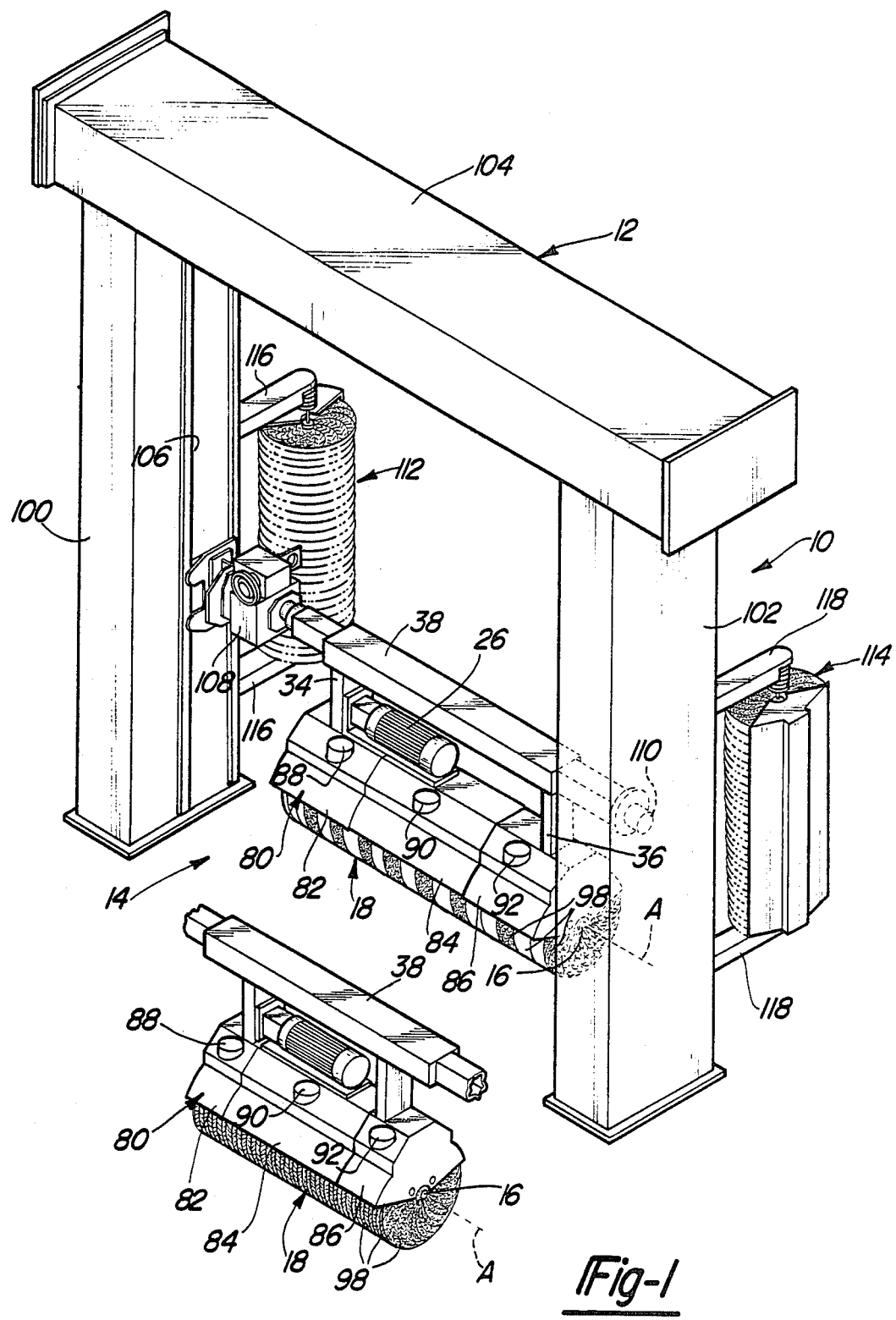
FIG. 1 is a perspective view of a tack-off assembly constructed in accordance with the present invention showing the take-off means expanded within the assembly and contracted in an exploded fragmentary section.

A tack-off assembly constructed in accordance with the present invention is generally shown at 10 in the Figures. The assembly 10 includes a support structure generally indicated at 12 defining a path 14 extending therethrough. Axle means 16 is mounted on the support structure 12 and defines an axis A. Tack-off means generally indicated at 18 is mounted on the axle means 16 for moving dust particles from a vehicle body generally indicated at 20 by contacting the surface of the vehicle body 20 traveling along the path 14. The invention is characterized by expandable hub means generally indicated at 22 in FIG. 2 connecting the tack-off means 18 to the axle means 16 for selectively expanding and contracting the tack-off means 18 along the axis A.

More specifically, the hub means 22 includes a plurality of hub members 24 mounted on the axle means 16. The axle means 16 is an axle or shaft member rotatably driven by a motor 26 through a belt and gearing mechanism generally indicated at 28. The hub means 22 further includes expandable spacing means 30 disposed between a plurality of the hub members 24 on the axle 16 for spacing the hub members 24 equally apart when the take-off means 18 is expanded along the axis A. The hub means 22 further includes actuator means generally indicated at 32 for forcing the hub members 24 together and compressing the spacing means 30 and alternatively spacing the hub members 24 apart and expanding the spacing means 30.

Figure 2:
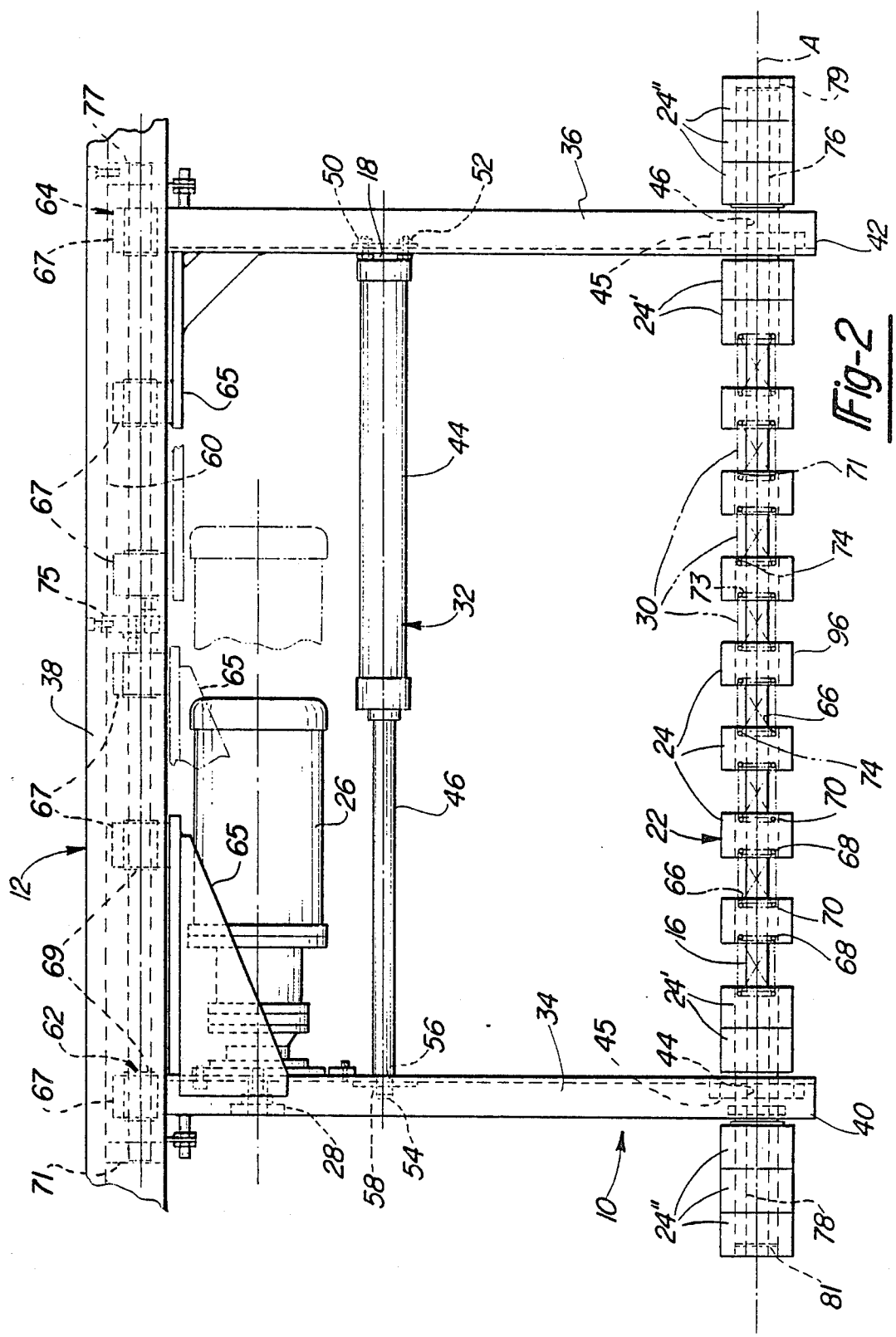
FIG. 2 is an enlarged fragmentary elevational view of the tack-off assembly not including feathers mounted thereon.

The spacing means includes a plurality of spring members 30 mounted on the axle 16. The spring members can be helically wound springs 30. The axle member 16 extends through each of the springs 30. The spring members 30 are in abutting engagement with adjacent hub members 24. As shown in FIG. 2, a plurality of the hub members 24 centrally disposed on the axle member 16 are spaced apart by the spring members 30. Other hub members 24' do not have springs between them and remain continually in abutting contact with each other. All of the hub members 24, 24' are keyed to the axle member 16 (keys not shown) for rotation therewith.

The actuator means 32 includes a pair of spaced arms 34, 36 extending from a support member 38. Each of the arms 34, 36 has a terminal portion 40, 42 supporting a portion of the axle member 16 and contacting one of the outermost ones of the hub members 24 in abutting engagement. The axis A passes through the terminal portion 40 of the arms 34, 36. The terminal portions 40 and 42 include openings 44 and 46, respectively, through which the axle 16 passes. The axle 16 is mounted in bearing 45, the bearing 45 being secured within the openings 44,46 for supporting the axle 16. Thusly, the openings 44 and 46 are in sliding engagement with the axle 16.

The actuator means 32 further includes a drive mechanism for moving the arms 34, 36 towards each other to force the members 24 to compress the spring members 30 and force the hub members 24 together and for moving the arms 34, 36 apart, allowing the spring members 30 to expand and space the hub members 24 apart equidistantly along the axle 16. The drive mechanism includes a fluid actuated cylinder having a housing 44 and a rod member 46 extending therefrom for reciprocating movement into and out of the housing 44. The housing 44 has one end 48 secured by mounting bolts 50 and 52 to the arm 36. the piston 46 includes an end portion 54 having threads thereon. The threaded end portion 54 is secured through an opening 56 in the arm 34 by a nut member 58.

The support member 38 includes a guide track 60 extending along the length of the support member 38 and parallel to axis A. Each of the arms 34, 36 includes an end portion generally indicated at 62, 64, respectively, mounted on the track 60 for travel therealong when moved by the cylinder assembly 44, 46. Each end portion 62,64 includes support arms 65. Followers 67 are secured to the end portions 62,64 and arms 65, the followers 67 including internal bearings 69 for riding on the track 60. The track 60 is supported within mounts 71,75,77. Central mount 75 controls the position of the mounting arms 34,36 on the track 60 by providing a stop on the track 60 for limiting movement of the followers 67. As the piston 46 is drawn into the cylinder housing 44, the arms 34, 36 are forced together. As the piston is extended from the cylinder housing 44, the arms 34, 36 are forced apart.

Each of the hub members 24 includes spring seat means for seating an end of each of the springs 30 therein. The spring seat means each include a recess 66 for containing the compressed spring 16 therein. The spring members 30 are contained within the recesses 66 when the hub members 24 are forced together into contact with each other by the arms 34, 36. More specifically, the assembly 10 includes a pair of insert members 68, 70 disposed within recesses 71 on each side of each of the hub members 24 that have a spring disposed adjacent thereto. Each of the insert members 68, 70 are cup-shaped and include the recesses 66. Each spring member 30 has two ends 72, 73 seated within adjacent and opposed recesses 66. Each of the recesses 66 has a side wall 74 of a predetermined height to contain half of the spring member 30 therein when the spring member 30 is compressed. When two hub members are forced together into adjacent contact by the arms 34, 36, the facing cup-shaped insert members 68, 70 form a pocket completely containing the entire compressed spring 30.

The axle means includes a second axle member 76 and a third axle member 78, each having a plurality of hub members 24" mounted thereon and keyed thereto. The axle members 76,78 are connected to the axle member 16 by end mounts 79,81. The second and third axle members 76, 78 are collapsible over the first axle member 16 as the arms 34, 36 force the hub members 24 together. The second and third axles 76, 78 can be constructed as hollow axle members having an inner diameter which is greater than the outer diameter of the first axle member 16. The second and third axle members 76, 78 are secured to the arms 34, 36 so that as the arms are moved together and slide over the axle 16, thereby compressing the hub members 24 together, the second and third axles 76, 78 collapse or slide over the outer surface of the first axle 16.

The first, second and third axles 16, 76, 78 define an effective length of the axle means. Actuation of the arms 34, 36 to move together compresses the hub members 24 between the arms 34, 36 and collapses a second and third axle member 76, 78 over the first axle member 16 to decrease the effective length of the axle means and the tack-off means 18 mounted thereon.

A shroud generally indicated at 80 is mounted on the support structure 12 over a portion of the tack-off means 18 for covering a portion of the tack-off means 18. The shroud 80 includes a plurality of shroud members 82, 84, 86 in sliding engagement with each other for collapsing together as the arms 34, 36 force the hub members 24 together. As best shown in FIG. 1, each of the shrouds 82, 84, 86 includes openings 88, 90, 92, respectively, adapted to be connected to a vacuum system generally indicated at 94 in FIGS. 3 and 4.

Each of the hub members 24, 24', 24" have an annular radial peripheral surface 96. The tack-off means 18 includes a plurality of feathers 98 mounted on the peripheral surface 96 of the hub members 24, 24', 24" and extending radially therefrom. The feathers 98 are of the type which maintain an electrostatic charge upon rubbing an object's surface and attract dust through the electrostatic charge. Typically, feathers from ostriches and emus are used for this purpose.

Figure 4:
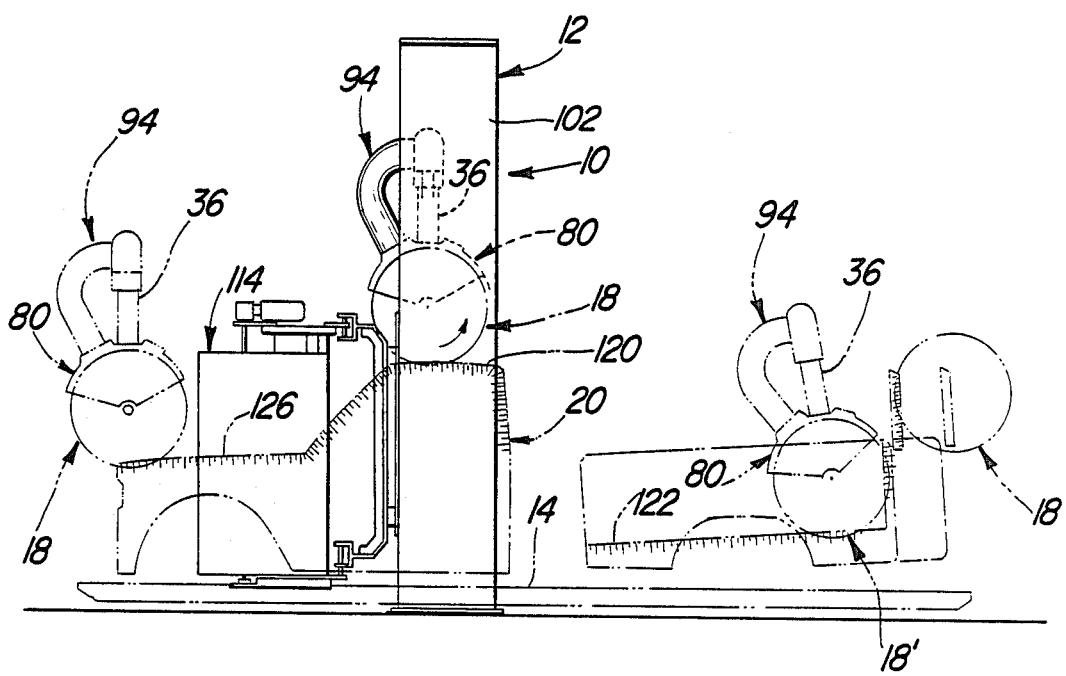
FIG. 4 is a side-elevational view of a vehicle body passing through the present invention showing the take-off means in several positions exploded from the assembly in relation to the several different portions of the vehicle body.

The support member 38, arms 34, 36, and hub means 22 compress the feather duster assembly. The feather duster assembly is operatively connected to a supertructure support comprising a pair of vertical support members 100, 102 connected together by a horizontal support member 104. One of the vertical members 100 includes a guide track 106. A motor tracking system mounted within the support member 104 is operatively connected to the support member 38. The other end 110 of the support member 38 is supported in a guide track (not shown) in the vertical member 102. Selective operation of the motor system moves the feather duster assembly up and down along the guide track 106 and the guide track in the vertical member 102. Motor assembly 108 rotates the feather duster assemsbly 18 to contact vertical as well as horizontal surfaces, as shown in FIG. 4. Additional side duster assemblies generally indicated at 112 and 114 are supported from the support members 100 and 102 by swinging arms 116 and 118, respectively. The arms 116 and 118 move the side duster assemblies 112 and 114 into and out of the path 14. Although the side duster assemblies 112 and 114 are not shown as expandable and contactible assemblies, the side duster assemblies 112, 114 can also be constructed as expandable and contractible.

In operation, and as shown in FIG. 1, the feather duster assembly 18 mounted on the assembly is shown expanded and in the contracted condition as exploded from the assembly. The feathers 98 are mounted in sufficient quantities on the hub members 24, 24', 24" so as to completely fill the void between the ends of the feather duster assembly whether in the expanded or the contracted condition. In other words, the hub members 24, 24', 24" are not visible between the feathers 98 in either the expanded or contracted condition.

FIG. 2 shows the assembly, sans feathers, in the expanded condition in solid lines, and shows the motor 26 and followers 67 in the contracted condition in hatch lines.

Figure 3:
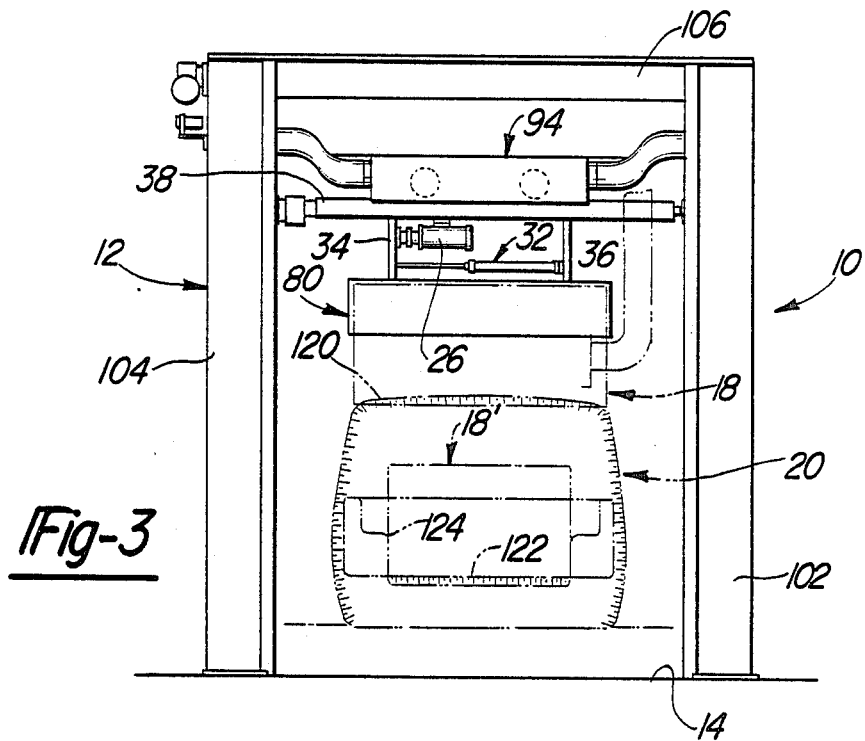
FIG. 3 is an elevational view of the present invention having an automobile passing therethrough.

FIGS. 3 and 4 show the operation of the present invention as a flat-bed truck body 20 passes therethrough. Referring to FIG. 3, the feather duster assembly shown at 18 contacts the hood 120 of the vehicle body 20 in the expanded condition. To contact the flat bed 122 of the body 20, the feather duster assembly shown at 18' is contracted in length so as to fit within the side walls 124 of the vehicle body 20.

This is further illustrated in FIG. 4 wherein the forward exploded view of the feather duster assembly 18 contacts the hood 126 of the body 20 in the expanded condition. The feather duster assesmbly 18 contacting the roof 120 of the cab is shown within the support structure 12 and is likewise in the expanded condition. The rearwardly exploded feather duster assembly 18' is contracted as it contacts the flat bed 122 of the vehicle body 20. The most rearwardly exploded feather duster assembly 18 is again expanded as it contact the trailing edge of the vehicle body 20.

The expansion and contraction of the feather duster assembly can be automatically controlled by a central computer unit. Such control can be programmed for a continual automatic tack off of a plurality of vehicle bodies passing along an assembly line.

The invention has been described in an illustrative manner, and it is to be understood that the terminology which has been used in intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A tack-off assembly (10) comprising: a support structure (12) defining a path (14) extending therethrough; axle means (16) mounted on said support structure (12) defining an axis A; tack-off means (18) mounted on said axle means (16) for removing dust particles by contracting the surface of an object (20) traveling along said path (14); and characterized by expandable hub means (22) connecting said tack-off means (18) to said axle means (16) for selectively expanding and contracting said tack-off means (18) along said axis A, said hub means (22) including a plurality of hub members (24), expandable spring means disposed between at least two of said hub members (24) on said axle means (16) for spacing said hub members (24) equidistantly apart when said wiping means is expanded along said axis A, and actuator means (32) for forcing said hub members (24) together and compressing said spacing means (30) and alternatively spacing said hub members (24) apart and expanding said spacing means (70), said spacing means including at least one spring member (30) mounted on said axle means (16), said spring member (30) being in abutting engagement with adjacent ones of hub members (24).

2. A tack-off assembly (10) comprising: a support structure (12) defining a path (14) extending therethrough; axle means (16) mounted on said support structure (12) defining an axis A; tack-off means (18) mounted on said axle means (16) for removing dust particles by contracting the surface of an object (20) traveling along said path (14); and characterized by expandable hub means (22) connecting said tack-off means (18) to said axle means (16) for selectively expanding and contracting said tack-off means (18) along said axis A, said hub means (22) including a plurality of hub members (24), expandable spring means disposed between at least two of said hub members (24) on said axle means (16) for spacing said hub members (24) equidistantly apart when said wiping means is expanded along said axis A, and actuator means (32) for forcing said hub members (24) together and compressing said spacing means (30) and alternatively spacing said hub members (24) apart and expanding said spacing means (70), said spacing means including at least one spring member (30) mounted on said axle means (16), said spring member (30) being in abutting engagement with adjacent ones of hub members (24) and drive means including a fluid actuated cylinder having a housing (44) and a rod member (46) extending therefrom for movement into and out of said housing (44); said housing (44) being operatively connected to one of said arms (36) and said piston (46) being operatively connected to the other of said arms (34).

3. An assembly as set forth in claim 2 further characterized by said support structure (12) including a guide track (60) parallel to axis A, said arms (34,36) being mounted on said track (60) for traveling therealong when moved by said actuator means (32).

4. An assembly as set forth in claim 2 further characterized by said axle means including an axle member (16) mounted for axial rotation on said axis A, said hub members (24) being keyed to said axle member (16) for rotation therewith, said axle member (16) extending through each of said spring members (30).

5. An assembly as set forth in claim 4 further characterized by each of said hub members (24) including spring seat means for seating an end of each of said springs (30) therein and having a recess (66) for containing said compressed spring (16) therein whereby said spring members (30) are contained within said recesses (66) when said hub members (24) are forced together into contact with each other by said arms (34,36).

6. An assembly as set forth in claim 5 further characterized by including a pair of insert members (68,70) disposed within each of said hub members (24), each said insert members (68,70) being cup-shaped and including said recess (66), each spring member (30) having an end (72) seated within one of said recesses (66), said recess (66) having side walls (74) of a predetermined height to contain half of said spring member (30) therein when said spring member (30) is compressed.

7. An assembly as set forth in claim 6 further characterized by said axle means including a second axle member (76) having at least one hub member (24") mounted thereon, said second axle member (76) being collapsible over said first axle member (16) as said arms (34,36) force said other hub members (24) on said first mentioned axle (16) together.

8. An assembly as set forth in claim 7 further characterized by said first axle member (16) being mounted between said arms (34,36), said second axle member (74) being mounted outside one of said arms (36), said axle means further including a third axle member (76) mounted outside said other arm (34) and being collapsible over said first axle (16), said first, second and third axles (16,76,78) defining an effective length of said axle means, said second and third axles (76,78) being operatively connected to said arms (34,36) whereby actuation of said arms (34,36) to move together compresses said hub members (24) between said arms (34,36) and collapses said second and third axle members (76,78) over said first axle member (16) to decrease said effective length of said axle means and said tack-off means (18) mounted thereon.

9. An assembly as set forth in claim 8 further characterized by including shroud means (80) mounted on said support structure (12) over a portion of said tack-off means (18) for covering a portion of said tack-off means (18).

10. An assembly as set forth in claim 9 further characterized by said shroud means (80) including a plurality of shroud members (82,84,86) in sliding engagement with each other for collapsing together as said arms (34,36) force said hub members (24) together.

11. An assembly as set forth in claim 10 further characterized by said hub members (24,24',24") having an annular radially peripheral surface (96), said tack-off means (18) including a plurality of feathers (98) mounted on said peripheral surface (46) and extending radially therefrom.

12. A wiper assembly (10) comprising: a support structure (12) defining a path (14) extending therethrough, axle means (16) mounted on said support structure (12) defining an axis A; wiping means (18) mounted on said axle means (16) for contacting and wiping the surface of an object (20) traveling along said path (14); and characterized by expandable hub means (22) connecting said wiping means (18) to said axle means (16) for selectively expanding and contracting said wiping means (18) along said axis A, said hub means (22) including a plurality of hub members (24), expandable spacing means (30) disposed between each of said hub members for spacing said hub members (24) equidistantly apart when said wiping means (18) is expanded along said axis A, and actuator means (32) for forcing said hub members (24) together and compressing said spacing means (30) and alternatively spacing said hub members (24) on said axis A and expanding said spacing means (30), said spacing means including a plurality of spring members (30) mounted on said axle means (16) and having ends (72,73) abutting adjacent hub members (24), said actuator means (32) including a pair of spaced arms (34,36), each of said arms (34,36) having a terminal portion (40,42) contacting an outermost one of said plurality of hub members (24,24'), said actuator means (32) further including drive means for moving said arms together to force said hub members (24) together to compress said spring members (30) and for moving said arms (34,36) apart allowing said spring members (30) to expand and space said hub members (24) equidistantly apart, drive menas including a fluid actuated cylinder having a housing (44) and a rod member (46) extending therefrom for movement into and out of said housing (44); said housing (44) being operatively connected to one of said arms (36) and said piston (46) being operatively connected to the other of said arms (34).

13. A wiper assembly (10) comprising: a support structure (12) defining a path (14) extending therethrough, axle means (16) mounted on said support structure (12) defining an axis A; wiping means (18) mounted on said axle means (16) for contacting and wiping the surface of an object (20) traveling along said path (14); and characterized by expandable hub means (22) connecting said wiping means (18) to said axle means (16) for selectively expanding and contracting said wiping means (18) along said axis A, said hub means (22) including a plurality of hub members (24), expandable spacing means (30) disposed between each of said hub members for spacing said hub members (24) equidistantly apart when said wiping means (18) is expanded along said axis A, and actuator means (32) for forcing said hub members (24) together and compressing said spacing means (30) and alternatively spacing said hub members (24) on said axis A and expanding said spacing means (30), said spacing means including a plurality of spring members (30) mounted on said axle means (16) and having ends (72,73) abutting adjacent hub members (24), said actuator means (32) including a pair of spaced arms (34,36), each of said arms (34,36) having a terminal portion (40,42) contacting an outermost one of said plurality of hub members (24,24'), said actuator means (32) further including drive means for moving said arms together to force said hub members (24) together to compress said spring members (30) and for moving said arms (34,36) apart allowing said spring members (30) to expand and space said hub members (24) equidistantly apart.

* * * * *